United States Patent Office 3,819,735
Patented June 25, 1974

---

3,819,735
ALKYLATION CATALYST AND PROCESS OF ALKYLATING BENZENE
Benny J. Argento, South Charleston, and Edward A. Rick, Charleston, W. Va., assignors to Union Carbide Corporation, New York, N.Y.
No Drawing. Filed Feb. 4, 1972, Ser. No. 223,781
Int. Cl. C07c 3/56, 3/62
U.S. Cl. 260—671 P                    7 Claims

ABSTRACT OF THE DISCLOSURE

The disclosure of this application is directed to a liquid alkylation catalyst which is based on aluminum chloride; and to a process of alkylating benzene with propylene or n-butene to form isopropylbenzene (cumene) or secondary butylbenzene and transalkylating, to isopropylbenzene or secondary butylbenzene, the corresponding dialkylbenzene formed as a by-product in the reaction mixture by: contacting a reaction mixture containing benzene and propylene or an n-butene or mixtures of propylene and n-butene with a sufficient amount of a liquid alkylation catalyst, as previously described, to provide a concentration of aluminum chloride in the reaction mixture of about 0.05 to about 0.25 percent by weight.

---

This invention relates to a liquid alkylation catalyst, which is based on aluminum chloride, and to a process of alkylating benzene in the presence thereof. More particularly, this invention relates to a process of alkylating benzene with propylene or n-butene to form isopropylbenzene (cumene) or secondary butylbenzene and transalkylating, to isopropylbenzene or secondary butylbenzene, the corresponding dialkylbenzene formed as a by-product in the reaction mixture by: contacting a reaction mixture containing benzene and propylene or an n-butene or mixtures of propylene and an n-butene with a sufficient amount of a liquid alkylation catalyst, as previously described, to provide a concentration of aluminum chloride in the reaction mixture of about 0.05 to about 0.25 percent by weight.

One of the methods currently being used to prepare isopropylbenzene involves alkylating benzene with propylene in a reaction mixture containing a solid, phosphoric acid; the solid, phosphoric acid serving as an alkylation catalyst.

The principal reaction which takes place in the alkylation of benzene with propylene can be represented by the equation:

Equation No. 1—Principal Alkylation Reaction $$C_6H_6 + C_3H_6 \longrightarrow C_6H_5C_3H_7$$
Benzene   Propylene   Isopropylbenzene (cumene)

In addition to the principal reaction, which results in the formation of isopropylbenzene, a secondary reaction also occurs which yields the by-product, diisopropylbenzene. This secondary reaction can be represented by the following equation:

Equation No. 2—Secondary Alkylation Reaction $$C_6H_5C_3H_7 + C_3H_6 \longrightarrow C_6H_4(C_3H_7)_2$$
isopropylbenzene   propylene   diisopropylbenzene In an attempt to suppress the formation of the diisopropylbenzene product, it has been suggested that in carrying out the alkylation reaction in the presence of a solid, phosphoric acid, a large excess of benzene be used. It has been found, however, that using a large excess of benzene requires the use of costly process procedures in order to recover the excess or unreacted benzene. Consequently, carrying out the alkylation of benzene using a large excess of benzene, as described, has increased the overall cost of the alkylation process to an undesirable extent.

It has also been suggested that the alkylation of benzene with propylene be carried out using relatively high concentrations of an aluminum chloride catalyst, generally in excess of five (5) percent by weight based on the weight of the feed. This suggested expedient is intended to effect the alkylation of benzene with propylene to form isopropylbenzene and to transalkylate the diisopropylbenzene product to isopropylbenzene.

The transalkylation of diisopropylbenzene to isopropylbenzene can be represented by the following equation:

Equation No. 3—Transalkylation Reaction $$C_6H_4(C_3H_7)_2 + C_6H_6 \longrightarrow 2C_6H_5C_3H_7$$
diisopropylbenzene   benzene   isopropylbenzene The use of relatively high concentrations of aluminum chloride has not proved to be particularly desirable as it leads to the formation of the contaminant, n-propylbenzene. Normal propylbenzene is very difficult to separate from isopropylbenzene by conventional distillation techniques; and isopropylbenzene, contaminated with n-propylbenzene, cannot be successfully used to prepare phenol and acetone, the principal field of use for isopropylbenzene, by the oxidation and cleavage process in which isopropylbenzene is oxidized to the corresponding hydroperoixde and the hydroperoxide cleaved to phenol and acetone. If present with isopropylbenzene during the oxidation reaction, n-propylbenzene will be oxidized to n-propylbenzene hydroperoxide which in turn, when cleaved, will form propionaldehyde which is a contaminant with respect to acetone. The oxidation and cleavage reactions are described in detail in the G. G. Joris U.S. Pats. 2,577,768 patented Dec. 11, 1951 and U.S. 2,628,281 patented Jan. 20, 1953.

The present invention provides for the alkylation of benzene with propylene to form isopropylbenzene and for the transalkylation, to isopropylbenzene, of the diisopropylbenzene formed as a by-product during the principal alkylation reaction, without the disadvantages previously discussed.

Furthermore, the present invention provides for the alkylation of benzene with n-butene to form secondary butylbenzene, and for the transalkylation, to secondary butylbenzene, of the di(secondary butyl)benzene formed as a by-product during the principal alkylation reaction. Alkylation of benzene with n-butene, in accordance with this invention suppresses the formation of isobutylbenzene which is an undesirable contaminant with respect to secondary butylbenzene. The oxidation of secondary butylbenzene to the corresponding hydroperoxide is appreciably slowed when secondary butylbenzene is contaminated with isobutylbenzene.

The alkylation of benzene with n-butene to from secondary butylbenzene and the transalkylation, to secondary butylbenzene, of the di(secondary butyl)benzene by-product formed during the principal alkylation reaction can be represented by the equations noted below.

Equation No. 4—Principal Alkylation Reaction $$C_6H_6 + C_4H_8 \longrightarrow C_6H_5C_4H_9$$
benzene   n-butene   Secondary butylbenzene Equation No. 5—Secondary Alkylation Reaction $$C_6H_5C_4H_9 + C_4H_8 \longrightarrow C_6H_4(C_4H_9)_2$$
secondary butylbenzene   n-butene   di(secondary butyl)benzene Equation No. 6—Transalkylation $$C_6H_4(C_4H_9)_2 + C_6H_6 \longrightarrow 2C_6H_5C_4H_9$$
di(secondary butyl)benzene   benzene   secondary butylbenzene The present invention also allows for the preparation of isopropylbenzene and secondary butylbenzene in the same reaction mixture by providing a reaction mixture containing benzene and a mixture of propylene and $n$-butene.

In addition, the present invention allows for the alkylation of benzene with propylene or $n$-butene at relatively low temperatures, as low as 80° C. thus reducing insoluble tar and by-product formation. Also, at the low concentrations of catalyst used in accordance with the present invention, recovery and recycle of the catalyst is no longer necessary thus eliminating costly process steps and costly equipment related thereto.

The present invention is effected, using as an alkylation catalyst, a liquid, aluminum chloride catalyst in an amount sufficient to provide, in the reaction mixture, a concentration of aluminum chloride of about 0.05 to about 0.25 percent by weight based on the weight of the reaction feed.

A particularly desirable catalyst for the alkylation of benzene with propylene is a liquid complex of aluminum chloride, hydrogen chloride, diisopropylbenzene and benzene wherein the relative amounts of each component used in preparing the catalyst are indicated below and are based on "per mole of aluminum chloride."

benzene—about 0.3 to about 12 moles, preferably about 0.4 to about 4 moles.
diisopropylbenzene—about 0.7 to about 25 moles, preferably about 0.7 to about 8 moles.
hydrogen chloride—about 0.5 to about 0.7 mole, preferably about 0.5 mole.

Within the range of amounts noted above, an even more preferred liquid complex for the alkylation of benzene with propylene is one based on the materials and amounts thereof noted below.

aluminum chloride—
hydrogen chloride—about 0.5 mole per mole aluminum chloride.
diisopropylbenzene—about 1.8 moles per mole aluminum chloride.
benzene—about 0.84 mole per mole aluminum chloride.

A liquid complex, based on aluminum chloride, hydrogen chloride, diisopropylbenzene and benzene, in addition to effecting the desirable results previously described, has excellent room temperature stability.

Other suitable catalysts for the alkylation of benzene with propylene are exemplified by liquid complexes of aluminum chloride, diisopropylbenzene and an alkylchloride having a maximum of 12 carbon atoms such as methylchloride, ethylchloride, 1-chloropropane, 2-chloro-2-methylbutane and other like chloride donors. The alkylchloride is used in the same molar amounts as hydrogen chloride in producing suitable liquid complexes, that is about 0.5 to about 0.7 mole, preferable about 0.5 mole per mole of aluminum chloride.

Among suitable liquid complexes for the alkylation of benzene with $n$-butene are those based on aluminum chloride, disecondary butylbenzene and a chloride donor such as hydrogen chloride or an alkylchloride as described above. Amounts used to prepare these liquid products are the same as indicated above with respect to catalysts for alkyalting benzene with propylene.

Preparation of the liquid alkylation catalysts is conveniently carried out by admixing the components thereof in a suitable reaction vessel at room temperature, about 23° C. to about 65° C. Completion of the reaction, as evidenced by consumption of the aluminum chloride, takes about 20 to about 30 minutes. The reacted mixture is allowed to stand with the result that the mixture separates into two layers, a top layer of unreacted benzene product (benzene and/or dialkylbenzene) and a bottom layer which is the desired liquid complex. Recovery of the liquid complex can then be effected in a separatory funnel.

If desired, the reacted mixture can be used as a single phase mixture to catalyze the alkylation reaction. In that event, the unreacted benzene and/or dialkylbenzene serve as diluents with respect to the liquid complex.

It is to be understood that: the term diisopropylbenzene as used herein encompasses $o$, $m$ and $p$-diisopropylbenzene and mixtures thereof and that the term $n$ or normal butene encompasses 1-butene, 2-butene, cis and trans isomers and mixtures thereof.

In carrying out the alkylation reaction in accordance with the present invention, the "total equivalents" or "mole ratio" of reactants which makes up the total reaction feed is about 2 to about 10 to 1, preferably about 3 to about 6 to 1 and in the case of alkylating benzene with propylene is calculated by:

$$\frac{\text{moles benzene} + \text{moles diisopropylbenzene}}{\text{moles propylene} + 2 \text{ (moles of diisopropylbenzene)}}$$

In the case of alkylating benzene with $n$-butene, the calculation is made by:

$$\frac{\text{moles benzene} + \text{moles di(secondary butyl)benzene}}{\text{moles } n\text{-butene} + 2 \text{ [moles di(secondary butyl)benzene]}}$$

In the case of alkylating benzene with propylene and with $n$-butene in the same reaction mixture, the calculation is made by:

$$\frac{\text{moles benzene} + \text{moles di(secondary butyl)benzene} + \text{moles diisopropylbenzene}}{\text{moles propylene} + \text{moles } n\text{-butene} + 2 \text{ (moles diisopropylbenzene)} + 2 \text{ [moles di(secondary butyl)benzene]}}$$

The temperature at which the alkylation (including transalkylation) reaction is conducted can vary over a wide range, from as low as about 80° C. to as high as about 125° C. Generally, the alkylation reaction is conducted at temperatures of about 100° C. to about 120° C. with a temperature in the range of about 95° C. to about 105° C. being preferred. Since the alkylation reaction is exothermic, the reaction vessel is cooled to maintain the contents thereof to the temperatures noted. The process can be conducted under atmospheric, subatmospheric or superatmospheric pressures, with superatmospheric pressures being preferred. Also, it is preferred to conduct the alkylation process in a substantially anhydrous medium, preferably a medium containing less than about 35 p.p.m. water, in order that the catalytic activity of the liquid alkylation catalyst is not adversely affected.

Suitable reaction times are on the order of one-half hour, the actual time depending, in part upon the temperature at which the process is conducted.

The process of the present invention can be conducted batchwise or in a continuous fashion wherein unreacted benzene, di(secondary butyl)benzene, and/or diisopropylbenzene are recycled back into the reaction vessel.

Recovery of the desired products, that is isopropylbenzene and secondary butylbenzene at the completion of the reaction can be accomplished by methods well known in the art. For example, the crude product, resulting from the alkylation of benzene with propylene, is water-washed free of the liquid alkylation catalyst in a settling tank wherein the product layer is separated from the aqueous layer. The product layer is then fed to a mixer wherein it is admixed with sodium hydroxide (25 percent strength) to scrub out residual hydrochloric acid carried over from the water wash. Thereafter, the product layer is again water washed to remove any remaining hydrochloric acid and sodium hydroxide. The crude product is then distilled and materials recovered as indicated below:

First distillation column—operating at a temperature of 130° C. and a pressure of 40 p.s.i.g.—benzene recovered as the overhead.

Second distillation column—operating at a temperature of 160° C. and a pressure of 3 p.s.i.g.—isopropylbenzene recovered as the overhead.

Third distillation column—operating at a temperature of 120° C. and a pressure of 50 mm.—diisopropylbenzene recovered as the overhead.

In a like manner, when the crude product results from the alkylation of benzene with n-butene, the crude product is washed and scrubbed, as described above, and secondary butylbenzene recovered as the overhead in the second distillation column—operating at a temperature of 181° C. and a pressure of 3 p.s.i.g.

When the crude product contains both isopropylbenzene and secondary butylbenzene, as results from a reaction mixture containing benzene, propylene and n-butene, product recovery is effected in the second distillation column, after the washing and scrubbing steps previously described, wherein isopropylbenzene is recovered as the overhead at a temperature of 160° C. and a pressure of 3 p.s.i.g. and secondary butylbenzene is recovered as a side stream, from the same column, at a temperature of 193° C. and a pressure of 9 p.s.i.g.

It is to be noted that the disclosure of all patents noted is incorporated herein by reference.

In the following examples, which illustrate the present invention, the aluminum chloride content of the alkylation catalysts was determined by: weighing a sample, to the nearest 0.01 gram, into an Erlenmeyer flask and adding 100 ml. of water thereto. The contents of the flask were then swirled until the color thereof disappeared. The flask was then allowed to stand for 1.5 hours at room temperature and the contents thereof titrated with 0.5 N sodium hydroxide to a phenophthalein end point. Aluminum chloride content was then calculated using the following equation:

Percent py weight aluminum chloride
$$= \frac{(F)\ (\text{normality of NaOH})\ (\text{ml. titration})}{\text{grams of sample}}$$

$$F = \frac{(\text{mol. wt. of aluminum chloride})\ (100)}{(\text{functionality of aluminum chloride})\ (1000)}$$

Example I

This example illustrates the excellent stability of the preferred liquid alkylation catalysts of this inventon.

In each case, aluminum chloride, benzene and diisopropylbenzene were charged to a previously dried reaction flask equipped with a thermometer, overhead stirrer, gas sparger and an outlet vent to a mineral oil bubbler. Hydrogen chloride gas was fed from a bottle, through the gas sparger, and to the stirred reaction flask. The hydrogen chloride was fed into the reaction flask at a rate so as to maintain a minimum amount of HCl bubbles in the mineral oil. Upon completion of the reaction, as evidenced by consumption of the aluminum chloride, the liquid product was transferred to a separatory funnel and the lower liquid layer, the liquid complex, separated from the upper liquid layer which was made up of unreacted benzene and diisopropylbenzene.

The relative amounts in moles used in producing each liquid complex, temperatures at which each complex was prepared and the amount of aluminum chloride therein are noted below:

|  | Complex | | |
|---|---|---|---|
|  | A | B | C |
| Moles: | | | |
| Aluminum chloride | 1 | 1 | 1 |
| Benzene | 0.84 | 0.84 | 2 |
| Diisopropylbenzene | 1.8 | 1.8 | 3.6 |
| Hydrogen chloride | 0.5 | 0.5 | 0.5 |
| Temperature of reaction, ° C | 55 | 23 | 50 |
| Percent by weight aluminium chloride | 26.18 | 26.18 | 14.95 |

Each complex had excellent stability—no precipitation after 2 days.

A series of experiments were conducted wherein isopropylbenzene was produced continuously by alkylating benzene with propylene. The conditions under which each experiment was conducted are set forth in Table 1, below.

The liquid complex (catalyst A) which was used as the alkylation catalyst in these experiments was prepared as follows:

Into a reaction flask equipped with an overhead stirrer and inlets for the reactants there was charged:

aluminum chloride—260 grams—1.950 moles
diisopropylbenzene—1138.41 grams—7.016 moles
benzene—258.8 grams—3.313 moles The contents of the flask were heated to a temperature of 55° C. and hydrogen chloride gas, in an amount of 35.5 grams—0.974 moles, was fed into the reaction flask over a period of 2¼ hours. Thereafter, a further addition of 260 grams of aluminum chloride followed by 35.5 grams of hydrogen chloride (over a 2¼ hour period) was made to the reaction flask. The reaction or preparation of the catalyst was then made continuous by feeding, into the reaction flask, amounts of materials noted below:

|  | Grams per hour | Moles per hour |
|---|---|---|
| Aluminum chloride | 113.6 | 0.852 |
| Diisopropylbenzene | 248.8 | 1.534 |
| Benzene | 56.57 | 0.724 |
| Hydrogen chloride | 15.57 | 0.426 |

The aluminum chloride content of the liquid complex was 26 percent by weight. Sufficient amounts were then used in the alkylation reactions to provide the concentrations of aluminum chloride noted in Table 1.

Analysis relative to product distribution as noted in this specification was carried out by vapor phase chromatography.

Also, all experiments noted were carried out under substantially anhydrous conditions as previously described, and were conducted at 70 p.s.i.g.

TABLE 1

|  | 1 | 2 | 3 | 4 | 5 | 6 | 7 | 8 | 9 |
|---|---|---|---|---|---|---|---|---|---|
| Temperature, ° C | 100 | 100 | 120 | 100 | 100 | 120 | 120 | 120 | 110 |
| Feed, total equivalents: | | | | | | | | | |
| Benzene to propylene | 3.13 to 1 | 3.05 to 1 | 3.23 to 1 | 5.15 to 1 | 4.80 to 1 | 4.78 to 1 | 4.42 to 1 | 3.84 to 1 | 3.81 to 1 |
| Diisopropyl benzene, percent of total feed | 2.03 | 5.62 | 4.71 | 1.96 | 4.87 | 4.75 | 1.55 | 1.94 | 3.28 |
| Total feed, grams per hour | 6,417 | 6,417 | 6,417 | 6,417 | 6,417 | 6,417 | 6,417 | 6,417 | 6,417 |
| Aluminum chloride: | | | | | | | | | |
| Grams per hour | 7.23 | 7.60 | 7.74 | 7.87 | 8.03 | 8.27 | 8.35 | 8.94 | 11.08 |
| Concentration, percent by weight (based on total feed) | 0.11 | 0.118 | 0.12 | 0.123 | 0.125 | 0.129 | 0.13 | 0.139 | 0.173 |
| Product distribution (percent by weight unless otherwise noted): | | | | | | | | | |
| Lights | 0.079 | 0.062 | 0.094 | 0.056 | 0.08 | 0.1 | 0.045 | 0.14 | 0.100 |
| Benzene | 59.44 | 57.67 | 57.62 | 74.16 | 67.77 | 70.71 | 73.56 | 66.77 | 65.97 |
| Toluene, p.p.m. | 1,100 | 732 | 1,300 | 1,580 | 356 | 122 | 98 | 153 | 1,793 |
| Ethylbenzene, p.p.m. | 400 | 0.05 | 1,300 | 0.05 | 1,500 | 1,600 | 743 | 1,700 | 0.01 |
| Sec-butylbenzene, p.p.m. | 52 | 598 | 696 | 371 | 204 | 367 | 223 | 486 | 439 |
| Diisopropylbenzene | 8.53 | 14.78 | 7.67 | 1.87 | 4.61 | 3.52 | 2.25 | 2.71 | 3.48 |
| Heavies | 0.18 | 0.29 | 0.20 | 0.13 | 0.27 | 0.17 | 0.03 | 0.22 | 0.15 |
| Cumene | 31.55 | 26.94 | 34.11 | 23.52 | 27.02 | 25.27 | 23.95 | 29.89 | 30.03 |
| n-Propylbenzene, p.p.m. | 29 | 23 | 63 | 26 | * | 79 | 87 | 38 | 50 |
| Lbs. cumene/lb. AlCl₃ | 276.45 | 225.45 | 274.57 | 193.02 | 210.1 | 190.2 | 182 | 209.2 | 167.28 |

TABLE 1—Continued

|   | 10 | 11 | 12 | 13 | 14 | 15 | 16 | 17 | 18 |
|---|---|---|---|---|---|---|---|---|---|
| Temperature, °C | 110 | 110 | 120 | 100 | 100 | 100 | 120 | 99 | 120 |
| Pressure | | | | | | | | | |
| Feed, total equivalents: | | | | | | | | | |
| Benzene to propylene | 3.73 to 1 | 3.64 to 1 | 3.13 to 1 | 5.39 to 1 | 3.08 to 1 | 3.16 to 1 | 5.42 to 1 | 4.96 to 1 | 5.24 to 1 |
| Diisopropylbenzene, percent of total feed | 3.18 | 3.42 | 4.59 | 2.08 | 1.78 | 5.14 | 4.62 | 4.71 | 1.94 |
| Total feed, grams per hour | 6,417 | 6,417 | 6,417 | 6,417 | 6,417 | 6,417 | 6,417 | 6,417 | 6,417 |
| Aluminum chloride: | | | | | | | | | |
| Grams per hour | 12.28 | 12.91 | 14.69 | 14.89 | 14.98 | 15.00 | 15.74 | 15.98 | 16.03 |
| Concentration, percent by weight (based on total feed) | 0.19 | 0.2 | 0.228 | 0.232 | 0.233 | 0.234 | 0.245 | 0.249 | 0.25 |
| Product distribution, percent by weight unless otherwise noted: | | | | | | | | | |
| Lights | 0.098 | 0.104 | 0.145 | 0.082 | 0.100 | 0.105 | 0.108 | 0.097 | 0.094 |
| Benzene | 63.87 | 62.10 | 54.88 | 71.37 | 57.57 | 59.10 | 70.61 | 70.18 | 73.19 |
| Toluene, p.p.m | 1,600 | 1,119 | 1,807 | 1,663 | 1,754 | 1,402 | 452 | 1,000 | 588 |
| Ethylbenzene, p.p.m | 1,000 | 0.09 | 0.16 | 0.08 | 0.05 | 0.09 | 2,200 | 1,100 | 1,400 |
| Sec-butylbenzene, p.p.m | 753 | 311 | 675 | 296 | 618 | 500 | 556 | 77 | 282 |
| Diisopropylbenzene | 4.89 | 4.88 | 6.30 | 1.96 | 6.26 | 6.57 | 2.26 | 3.85 | 1.80 |
| Heavies | 0.12 | 0.14 | 0.17 | 0.10 | 0.15 | 0.17 | 0.64 | 0.12 | 0.16 |
| Cumene | 30.70 | 32.50 | 38.04 | 26.15 | 35.62 | 33.74 | 26.01 | 25.48 | 24.48 |
| n-Propylbenzene, p.p.m | 50 | 54 | 96 | 44 | 50 | 96 | 175 | 50 | 62 |
| Lbs. cumene/lb. AlCl₃ | 157.39 | 157.34 | 161.8 | 111.70 | 150.75 | 147.46 | 104.04 | 103.57 | 98.97 |

*None detected.

Experiments were also conducted wherein secondary butylbenzene was produced, continuously, by alkylating benzene with 1-butene. The liquid complex which was used as the alkylating catalyst was prepared by reacting aluminum chloride (0.8 moles) in a mixture of benzene (.72 moles) and di(secondary butyl) benzene (.144 moles) with anhydrous HCl (0.4 moles).

Conditions under which each experiment was conducted are set forth in Table II below.

TABLE II

|   | 19 | 20 |
|---|---|---|
| Temperature, °C | 100 | 120 |
| Pressure, p.s.i.g | 70 | 70 |
| Feed, total equivalents: | | |
| Benzene to 1-butene | 4.8 to 1 | 4.7 to 1 |
| Di-sec-butylbenzene (percent of total feed) | 3.5 | 3.4 |
| Total feed, grams per hour | 6,110 | 6,150 |
| Aluminum chloride: | | |
| Grams per hour | 6.2 | 7.0 |
| Concentration, percent by weight (based on total feed) | 0.10 | 0.11 |
| Production distribution (percent by weight unless otherwise noted): | | |
| Lights | (*) | 0.09 |
| Benzene | 71.6 | 70.0 |
| Toluene, p.p.m | 100 | 300 |
| n-Butylbenzene | (*) | (*) |
| tert-Butylbenzene | (*) | (*) |
| Di-sec-butylbenzene | 1.9 | 2.0 |
| Heavies | (*) | (*) |
| Sec-butylbenzene | 26.2 | 26.7 |
| Iso-butylbenzene | 0.3 | 1.1 |
| Lbs. sec-butylbenzene/lb. AlCl₃ | 266 | 236 |

* None detected.

Experiments set forth in Table III further establish that alkylation of benzene to isopropylbenzene and secondary butylbenzene can be carried out in the same reaction mixture, in accordance with the present invention. The alkylation catalyst used was Catalyst A (described previously).

TABLE III

|   | 21 | 22 |
|---|---|---|
| Temperature, °C | 80 | 101 |
| Pressure, p.s.i.g | 70 | 69 |
| Feed, total equivalents: Benzene to olefin composition | 5.02 to 1 | 4.65 to 1 |
| Propylene, percent | 58.33 | 58.77 |
| Butene-1, percent | 25.00 | 24.70 |
| Butene-2, percent | 16.66 | 16.53 |
| Diisopropylbenzene (percent of total feed) | 0 | 1.9 |
| Di-sec-butylbenzene (percent of total feed) | 0 | 1.2 |
| Total feed, grams per hour | 6,470 | 7,850 |
| Aluminum chloride: | | |
| Grams per hour | 5.96 | 9.40 |
| Concentration, percent by weight (based on total feed) | 0.092 | 0.12 |
| Product distribution (percent by weight unless otherwise noted): | | |
| Lights, p.p.m | 500 | 500 |
| Benzene | 71.16 | 70.43 |
| Toluene, p.p.m | 100 | 400 |
| Ethylbenzene | (*) | 0.002 |
| Diisopropylbenzene | 1.49 | 1.30 |
| Di-sec-butylbenzene | 0.36 | 0.27 |
| Butylpropylbenzene | 1.55 | 1.19 |
| Iso-butylbenzene, p.p.m | 300 | 400 |
| Cumene | 15.58 | 16.62 |
| Sec-butylbenzene | 9.38 | 10.15 |
| Lbs. product/lb. AlCl₃ | 261 | 223 |

*None detected.

What is claimed is:

1. A process of producing cumene and secondary butyl benzene suitable for use in the oxidation and cleavage process for making phenol by alkylating benzene with propylene or n-butene which comprises contacting a reaction mixture containing benzene and propylene or n-butene or mixtures of propylene and n-butene with a preformed liquid aluminum chloride alkylation catalyst complex wherein the concentration of aluminum chloride in the reaction mixture is about 0.05 to about 0.25 percent by weight, based on the weight of the reaction feed, whereby to produce such cumene and secondary butyl benzene.

2. A process of producing cumene suitable for use in the oxidation and cleavage process for making phenol by alkylating benzene with propylene which comprises contacting benzene with propylene in a reaction mixture containing a preformed liquid aluminum chloride alkylation catalyst complex wherein the concentration of aluminum chloride is about 0.05 to about 0.25 percent by weight based on the weight of the reaction feed, whereby to produce such cumene.

3. A process of producing cumene for use in the oxidation and cleavage process for making phenol by alkylating benzene with propylene to form isopropylbenzene and transalkylating diisopropylbenzene to isopropylbenzene which comprises contacting a mixture containing benzene, propylene and diisopropylbenzene with a preformed liquid aluminum chloride alkylation catalyst complex wherein the concentration of aluminum chloride is about 0.05 to about 0.25 percent by weight based on the weight of the reaction feed, whereby to produce such cumene.

4. A process as defined in claim 3 wherein the liquid preformed aluminum chloride alkylation catalyst complex is a liquid complex of aluminum chloride, benzene, diisopropylbenzene and hydrogen chloride.

5. A process of producing secondary butyl benzene suitable for use in the oxidation and cleavage process for making phenol by alkylating benzene with n-butene which comprises contacting benzene with n-butene in a reaction mixture containing a preformed liquid aluminum chloride alkylation catalyst complex wherein the concentration of aluminum chloride is about 0.05 to about 0.25 percent by weight based on the weight of the reaction feed, whereby to produce such secondary butyl benzene.

6. A process of producing secondary butyl benzene suitable for use in the oxidation and cleavage process for making phenol by alkylating benzene with n-butene to form secondary butylbenzene and transalkylating di-secondary butylbenzene to secondary butylbenzene which comprises contacting a mixture containing benzene, n-butene and di-secondary butylbenzene with a preformed liquid aluminum chloride alkylation catalyst complex wherein the concentration of aluminum chloride is about 0.05 to about 0.25 percent by weight based on the weight of the reaction feed, whereby to produce such secondary butyl benzene.

7. A process as defined in claim 6, wherein the preformed liquid aluminum chloride alkylation catalyst complex is a liquid complex of aluminum, chloride, di-secondary butylbenzene and hydrogen chloride.

References Cited

UNITED STATES PATENTS

| | | | |
|---|---|---|---|
| 2,855,430 | 10/1958 | Landau et al. | 260—672 T |
| 2,864,874 | 12/1958 | Enos | 260—672 T |
| 3,109,037 | 10/1963 | Schmidl et al. | 260—671 P |
| 3,448,161 | 6/1969 | Garcia et al. | 260—671 R |
| 3,629,350 | 12/1971 | Mocearov et al. | 260—672 T |
| 2,948,763 | 8/1960 | Ashmore | 260—671 R |
| 3,398,206 | 8/1968 | Strohmeyer et al. | 260—671 P |
| 3,488,741 | 1/1970 | Muller | 260—671 P |
| 3,536,772 | 10/1970 | Csomontanyi et al. | 260—672 T |
| 3,576,897 | 4/1971 | Strohmeyer | 260—671 P |

CURTIS R. DAVIS, Primary Examiner

U.S. Cl. X.R.

260—671 C, 672 T